United States Patent
Lee et al.

(10) Patent No.: US 10,459,291 B2
(45) Date of Patent: Oct. 29, 2019

(54) LIQUID CRYSTAL DISPLAY AND MANUFACTURING METHOD THEREOF

(71) Applicant: SAMSUNG DISPLAY CO., LTD., Yongin-si, Gyeonggi-do (KR)

(72) Inventors: Hyeok Jin Lee, Seongnam-si (KR); Oh Jeong Kwon, Hwaseong-si (KR); Ka Eun Kim, Yongin-si (KR); Soo Dong Kim, Seoul (KR); Su Jin Kim, Seoul (KR); Jin Won Kim, Suwon-si (KR); Jae Bum Cho, Seoul (KR); Baek Kyun Jeon, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 153 days.

(21) Appl. No.: 15/409,621

(22) Filed: Jan. 19, 2017

(65) Prior Publication Data

US 2017/0351146 A1    Dec. 7, 2017

(30) Foreign Application Priority Data

Jun. 2, 2016    (KR) .................. 10-2016-0068898

(51) Int. Cl.
*G02F 1/1337*    (2006.01)
*C08F 22/10*    (2006.01)
(Continued)

(52) U.S. Cl.
CPC ...... *G02F 1/133711* (2013.01); *C08F 22/105* (2013.01); *C09K 19/3852* (2013.01);
(Continued)

(58) Field of Classification Search
CPC ............ C09K 19/3852; C09K 19/3857; C09K 19/56; G02F 1/133707; G02F 1/133711;
(Continued)

(56) References Cited

U.S. PATENT DOCUMENTS 7,648,646 B2    1/2010  Harding et al.
7,731,865 B2    6/2010  Bernatz et al.
(Continued)

FOREIGN PATENT DOCUMENTS

CN        105572979 A    5/2016

OTHER PUBLICATIONS

Extended European Search Report dated Nov. 17, 2017, of the corresponding European Patent Application No. 17174112.7.

*Primary Examiner* — Sophie Hon
(74) *Attorney, Agent, or Firm* — Kile Park Reed & Houtteman PLLC

(57) ABSTRACT

A liquid crystal display includes: a first substrate, a second substrate overlapping the first substrate, a liquid crystal layer positioned between the first substrate and the second substrate and including a plurality of liquid crystal molecules, a first alignment layer positioned between the first substrate and the liquid crystal layer, a second alignment layer positioned between the second substrate and the liquid crystal layer, and a plurality of protrusions positioned at at least one of between the first alignment layer and the liquid crystal layer and between the second alignment layer and the liquid crystal layer, wherein at least one among the plurality of protrusions includes a polymer of a reactive mesogen, and the reactive mesogen is represented by Chemical Formula 1:

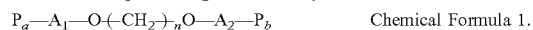

$P_a$—$A_1$—O—$(CH_2)_n$—O—$A_2$—$P_b$    Chemical Formula 1.

22 Claims, 10 Drawing Sheets

(51) Int. Cl.
*C09K 19/38* (2006.01)
*C09K 19/56* (2006.01)
*G02F 1/1343* (2006.01)
*G02F 1/1368* (2006.01)

(52) U.S. Cl.
CPC .......... *C09K 19/3857* (2013.01); *C09K 19/56* (2013.01); *G02F 1/1368* (2013.01); *G02F 1/133707* (2013.01); *G02F 1/133753* (2013.01); *G02F 1/134309* (2013.01); *G02F 2001/133726* (2013.01); *G02F 2001/133761* (2013.01); *G02F 2201/121* (2013.01); *G02F 2201/123* (2013.01); *Y10T 428/1005* (2015.01)

(58) Field of Classification Search
CPC ... G02F 1/133753; G02F 2001/133726; G02F 2001/133761; Y10T 428/1005
See application file for complete search history.

(56) References Cited

U.S. PATENT DOCUMENTS

| | | |
|---|---|---|
| 8,114,310 B2 | 2/2012 | Bernatz et al. |
| 8,283,000 B2 | 10/2012 | Matsumoto et al. |
| 8,304,035 B2 | 11/2012 | Bernatz et al. |
| 8,906,472 B2 | 12/2014 | Kuriyama et al. |
| 9,062,249 B2 | 6/2015 | Ogawa et al. |
| 2010/0328601 A1* | 12/2010 | Matsumoto ........ C09K 19/2007 349/182 |
| 2014/0231711 A1* | 8/2014 | Zhong ................. C09K 19/062 252/299.5 |
| 2015/0378193 A1 | 12/2015 | Song et al. |
| 2016/0032190 A1 | 2/2016 | Lim et al. |
| 2016/0033824 A1 | 2/2016 | Lim et al. |
| 2016/0124277 A1 | 5/2016 | Lee et al. |

* cited by examiner

LIQUID CRYSTAL DISPLAY AND MANUFACTURING METHOD THEREOF

CROSS-REFERENCE TO RELATED APPLICATION

Korean Patent Application No. 10-2016-0068898, filed on Jun. 2, 2016, in the Korean Intellectual Property Office, and entitled: "Liquid Crystal Display and Manufacturing Method Thereof," is incorporated by reference herein in its entirety.

BACKGROUND

1. Field

Embodiments relate to a liquid crystal display and a manufacturing method thereof.

2. Description of the Related Art

A liquid crystal display includes a display panel including field generating electrodes such as a pixel electrode and a common electrode, and a liquid crystal layer formed in an electric field generated by the field generating electrodes. The liquid crystal display forms the electric field to the liquid crystal layer, thereby displaying an image by determining an arrangement of liquid crystal molecules included the liquid crystal layer and controlling transmittance of a light passing through the liquid crystal layer.

The above information disclosed in this Background section is only for enhancement of understanding of the background of the invention and therefore it may contain information that does not form the prior art that is already known in this country to a person of ordinary skill in the art.

SUMMARY

Embodiments are directed to a liquid crystal display, including a first substrate; a second substrate overlapping the first substrate; a liquid crystal layer positioned between the first substrate and the second substrate and including a plurality of liquid crystal molecules; a first alignment layer positioned between the first substrate and the liquid crystal layer; a second alignment layer positioned between the second substrate and the liquid crystal layer; and a plurality of protrusions positioned at at least one of between the first alignment layer and the liquid crystal layer and between the second alignment layer and the liquid crystal layer, wherein at least one among the plurality of protrusions includes a polymer of a reactive mesogen, and the reactive mesogen is represented by Chemical Formula 1.

$$P_a—A_1—O\text{-}(CH_2)_n\text{-}O—A_2—P_b \quad \text{Chemical Formula 1}$$

In Chemical Formula 1, Pa and Pb are independently an acrylate group or a methacrylate group, $A_1$ includes

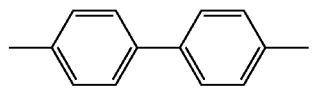

in which at least one hydrogen connected to a carbon ring is unsubstituted or substituted with one selected from a group including F, Cl, and Br, $A_2$ includes any one of

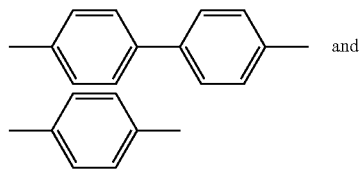

and in which at least one hydrogen connected to the carbon ring is unsubstituted or substituted with one selected from the group including F, Cl, and Br, and n is a natural number of 2 to 5.

The first alignment layer may include a first polymer, the first polymer may include a first main chain and a plurality of first side chains connected to the first main chain, and at least one among the plurality of first side chains may include at least one of a photoreactive group and a photoreactive group derivative.

The photoreactive group derivative included in the plurality of first side chains may be combined with the polymer of the reactive mesogen included in the plurality of protrusions.

The second alignment layer may include a second polymer, the second polymer includes a second main chain and a plurality of second side chains connected to the second main chain, and the plurality of second side chains do not include the photoreactive group and the photoreactive group derivative.

The reactive mesogen may be represented by Chemical Formula A or Chemical Formula B.

Chemical Formula A

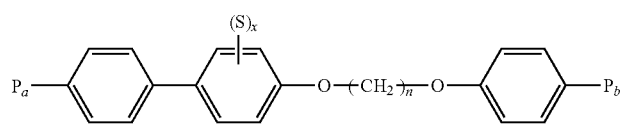

Chemical Formula B

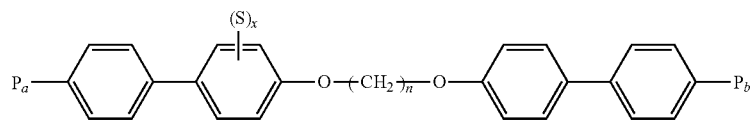

In Chemical Formula A and Chemical Formula B, Pa and Pb are independently the acrylate group or the methacrylate group, S is one selected from a group including F, Cl, and Br, x is 0, 1, 2, or 3, and n is the natural number of 2 to 5.

The reactive mesogen may have heat resistance of 250 degrees Celsius or more.

The density of the protrusions positioned between the first alignment layer and the liquid crystal layer may be higher than the density of the protrusions positioned between the second alignment layer and the liquid crystal layer among the plurality of protrusions.

The pre-tilt angle of the liquid crystal molecules adjacent to the first alignment layer among the plurality of liquid crystal molecules may be larger than the pre-tilt angle of the liquid crystal molecules adjacent to the second alignment layer among the plurality of liquid crystal molecules.

The first substrate and the second substrate may have a curved surface.

The liquid crystal display may further include: a thin film transistor positioned between the first substrate and the first alignment layer; a pixel electrode connected to the thin film transistor; and a common electrode forming an electric field with the pixel electrode.

The first alignment layer may include a lower alignment layer, an upper alignment layer, and a buffer region positioned between the lower alignment layer and the upper alignment layer, the upper alignment layer may include at least one of the photoreactive group and the photoreactive group derivative, the lower alignment layer may not include the photoreactive group and the photoreactive group derivative, and the buffer region may include less of the photoreactive group than the content of at least one of the photoreactive group and the photoreactive group derivative of the upper alignment layer.

Embodiments are also directed to a manufacturing method of a liquid crystal display, including preparing a lower panel including a first alignment layer positioned on a first substrate; preparing an upper panel including a second alignment layer positioned on a second substrate; forming a liquid crystal layer positioned between the lower panel and the upper panel and including a plurality of liquid crystal molecules; heat-treating the upper panel and the lower panel; and irradiating light to the lower panel, the upper panel, and the liquid crystal layer in a state in which an electric field is applied to the liquid crystal layer, and in the step of the heat treatment, the reactive mesogen included in at least one of the first alignment layer and the second alignment layer is adsorbed into the liquid crystal layer, in the light irradiation step, the reactive mesogen is polymerized to form a plurality of protrusions, and the reactive mesogen is represented by Chemical Formula 1.

$$P_a-A_1-O(-CH_2)_n O-A_2-P_b \quad \text{Chemical Formula 1}$$

In Chemical Formula 1, Pa and Pb are independently an acrylate group or a methacrylate group, $A_1$ includes

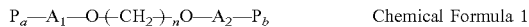

in which at least one hydrogen connected to a carbon ring is unsubstituted or substituted with one selected from a group including F, Cl, and Br, $A_2$ includes any one of

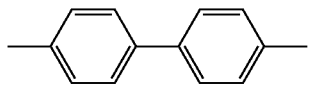

and

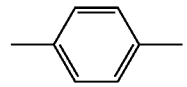

-continued in which at least one hydrogen connected to the carbon ring is unsubstituted or substituted with one selected from the group including F, Cl, and Br, and n is a natural number of 2 to 5.

The first alignment layer may include a first polymer, the first polymer may include a first main chain and a plurality of first side chains connected to the first main chain, and at least one among the plurality of first side chains may include a photoreactive group.

The second alignment layer may include a second polymer, the second polymer may include a second main chain and a plurality of second side chains connected to the second main chain, and the plurality of second side chains may not include the photoreactive group.

The reactive mesogen may be represented by Chemical Formula A or Chemical Formula B.

Chemical Formula A

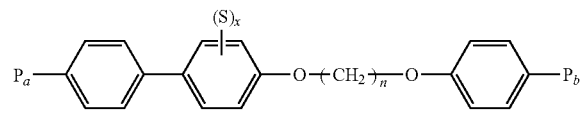

Chemical Formula B

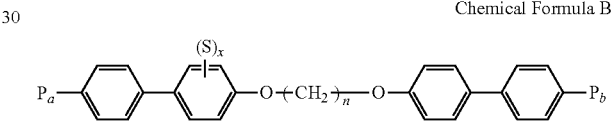

In Chemical Formula A and Chemical Formula B, Pa and Pb are independently the acrylate group or the methacrylate group, S is one selected from a group including F, Cl, and Br, x is 0, 1, 2, or 3, and n is the natural number of 2 to 5.

The density of the plurality of protrusions positioned between the first alignment layer and the liquid crystal layer may be larger than the density of the plurality of protrusions positioned between the second alignment layer and the liquid crystal layer.

Among the plurality of protrusions, the density of the protrusions positioned between the first alignment layer and the liquid crystal layer may be higher than the density of the protrusions positioned between the second alignment layer and the liquid crystal layer.

After the step of light irradiation, the pre-tilt angle of the liquid crystal molecules adjacent to the first alignment layer among the plurality of liquid crystal molecules may be larger than the pre-tilt angle of the liquid crystal molecules adjacent to the second alignment layer among the plurality of liquid crystal molecules.

The manufacturing method of the liquid crystal display may further include providing a curved surface to the first substrate and the second substrate.

The first alignment layer may be divided into a lower alignment layer and an upper alignment layer, a buffer region is formed between the lower alignment layer and the upper alignment layer, the upper alignment layer may include the photoreactive group, the lower alignment layer may not include the photoreactive group, and the buffer region may include less of the photoreactive group than the content of the photoreactive group distributed in the upper alignment layer.

Embodiments are also directed to a liquid crystal display, including a first substrate, a second substrate facing the first substrate, a liquid crystal layer between the first substrate and the second substrate, and an alignment layer between the first substrate and the second substrate and adjacent to the liquid crystal layer, the alignment layer having protruding polymeric structures, the polymeric structures being coupled to the material of the alignment layer via a (meth)acrylate moiety, the polymeric structures including a polymer unit having a first moiety that is a divalent biphenyl moiety, a diether linkage in which two oxygens are joined by a carbon chain of 2 to 5 carbons, and a second moiety that is a divalent phenyl or biphenyl moiety, wherein the first and second moieties are connected by the diether linkage.

The polymer unit may be represented by Chemical Formula 2:

   Chemical Formula 2 wherein, in Chemical Formula 2, $A_1$ is the first moiety, $A_2$ is the second moiety, and n is a natural number of 2 to 5.

$A_1$ may include

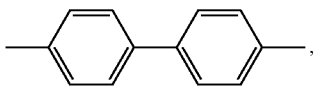, and $A_2$ may include

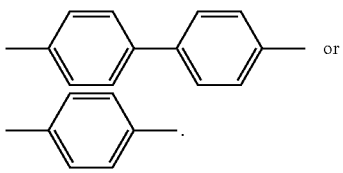

In $A_1$, at least one hydrogen connected to a carbon ring may be substituted with F, Cl, or Br.

In $A_2$, at least one hydrogen connected to a carbon ring may be substituted with F, Cl, or Br.

BRIEF DESCRIPTION OF THE DRAWINGS

Features will become apparent to those of skill in the art by describing in detail example embodiments with reference to the attached drawings in which.

DETAILED DESCRIPTION

Figure 1:
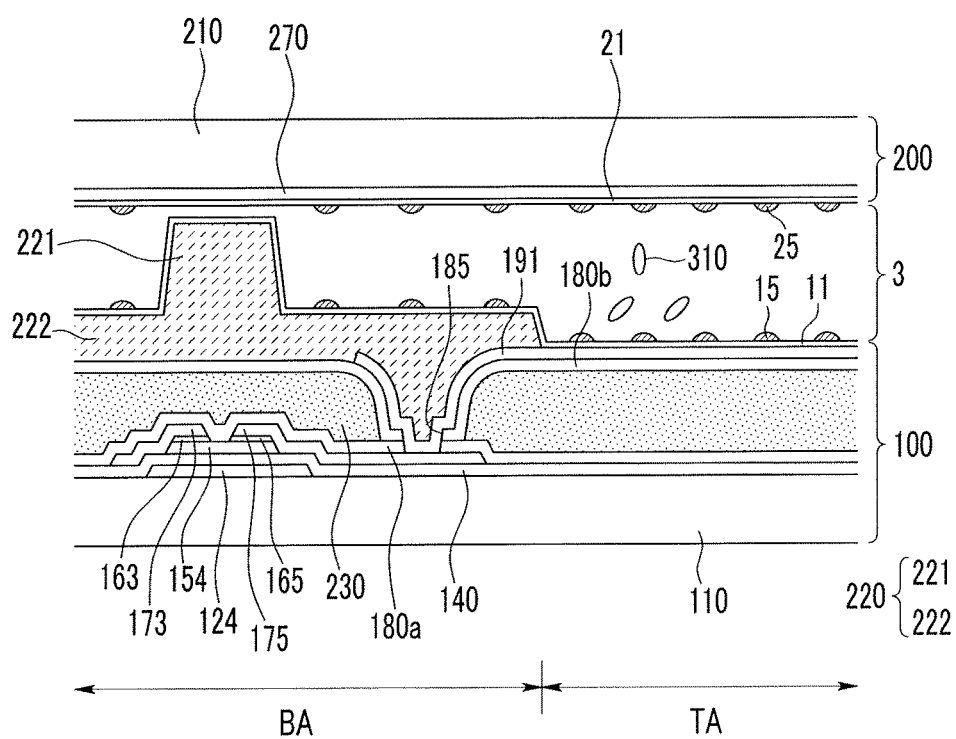
FIG. 1 illustrates a cross-sectional view showing a liquid crystal display according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" means positioning on or below the object portion, but does not essentially mean positioning on the upper side of the object portion based on a gravity direction.

Further, in the specification, the phrase "on a flat surface" means when an object portion is viewed from above, and the phrase "on a cross-section" means when a cross-section taken by vertically cutting an object portion is viewed from the side.

Figure 2:
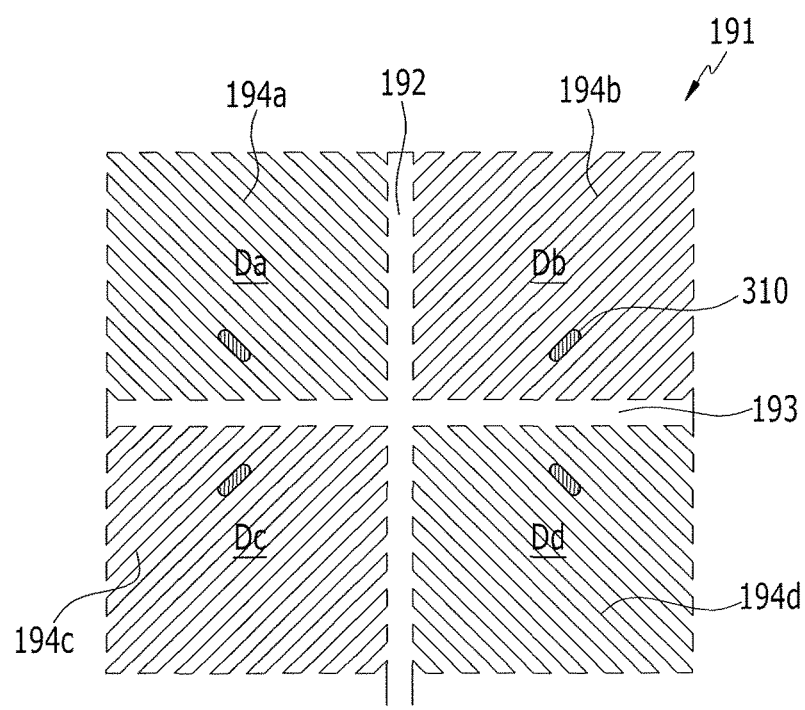
FIG. 2 illustrates a schematic top plan view showing a pixel electrode structure of FIG. 1.

FIG. 1 is a cross-sectional view showing a liquid crystal display according to an example embodiment. FIG. 2 is a schematic top plan view showing a pixel electrode structure of FIG. 1.

Referring to FIG. 1, the liquid crystal display according to the present example embodiment includes a lower panel 100 and an upper panel 200 overlapping each other, and a liquid crystal layer 3 interposed between the two display panels 100 and 200.

The lower panel 100 includes a first alignment layer 11 positioned at one side facing the liquid crystal layer 3, and the upper panel 200 includes a second alignment layer 21 positioned at one side facing the liquid crystal layer 3.

In the present example embodiment, a plurality of protrusions 15 and 25 are respectively positioned between the first alignment layer 11 and the liquid crystal layer 3 and between the second alignment layer 21 and the liquid crystal layer 3.

At least one of the plurality of protrusions 15 and 25 includes a polymer of a reactive mesogen, and the reactive mesogen may be represented by Chemical Formula 1.

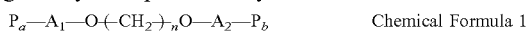   Chemical Formula 1

In Chemical Formula 1, Pa and Pb may be (meth)acrylate terminal moieties, and may each independently be an acrylate group or a methacrylate group. $A_1$ may include a divalent biphenyl moiety

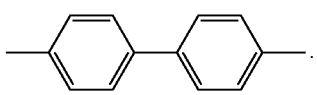.

In $A_1$, hydrogen connected to a carbon ring may be unsubstituted or substituted, for example, with F, Cl, or Br. $A_2$ may include a divalent moiety

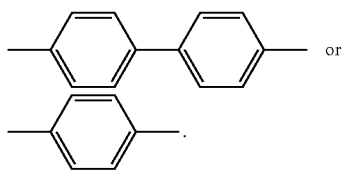 or

In $A_2$, hydrogen connected to the carbon ring may be unsubstituted or substituted with, for example, F, Cl, or Br. In the diether linkage —O—$(CH_2)_n$—O—, the n may be a natural number of 2 to 5.

Herein, the term "carbon ring" indicates carbons connected to each other to form a ring.

In Chemical Formula 1, when a component to be polymerized like the acrylate group or the methacrylate group receives ultraviolet rays, a crosslinking reaction is generated such that the polymer may be formed. The reactive mesogen may be polymerized within itself such that the plurality of protrusions 15 and 25 may be formed. Also, the reactive mesogen may be combined with a photoreactive group included in a side chain of the alignment layers 11 and 21 described below.

Additional aspects of the reactive mesogen will now be described in detail.

In the present example embodiment, the reactive mesogen may have a three or four ring structure. For example, in Chemical Formula 1, $A_1$ may have two ring structures, $A_2$ may have one or two ring structures. Ring structures adjacent to each other may be connected by a spacer such as —O—$(CH_2)_n$—O—. By having at least three ring structures, heat resistance may be improved. In the present example embodiment, the reactive mesogen has heat resistance to more than about 250 degrees Celsius such that the reactivity may be small at less than the temperature.

When the ring structure has three or more, a length of a part that becomes a conjugation is elongated, and an ultraviolet ray absorption wavelength band may move into a long wavelength such that the reactivity for the ultraviolet rays may increase. If the reactivity substantially increases, most of the reactive mesogen may be polymerized and moves into the first alignment layer 11 or the second alignment layer 21 to decrease surface energy, thereby forming the protrusion. In this case, directivity in which the polymerized reactive mesogen moves to either alignment layer side of the first alignment layer 11 and the second alignment layer 21 may not be uniform. Accordingly, selectivity of liquid crystal molecules 310 respectively adjacent to the upper and lower panels 100 and 200 that have pre-tilts that are different from each other may be reduced.

According to the present example embodiment, the reactive mesogen may have a spacer within the three or four ring structure, which may improve selectivity. Accordingly, the three or more ring structure may not be directly connected, and the length of the part that forms the conjugation may be reduced.

According to the present example embodiment, the spacer includes an ether group (—O—) having stability (instead of, for example, an ester group (—COO—) included in the reactive mesogen represented by Chemical Formula X and Chemical Formula Y, below) such that the spacer portion may be prevented from being disconnected when irradiated with ultraviolet rays.

Chemical Formula X

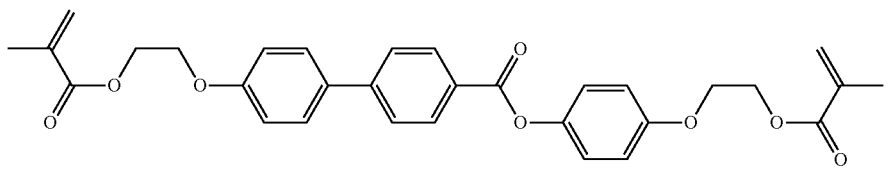

Chemical Formula Y

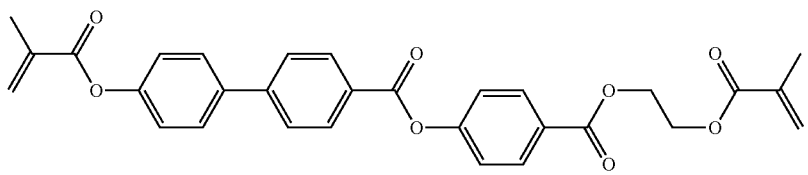

According to the present example embodiment, the spacer may include an alkylene group in which a carbon number is 2 to 5.

In general, if the length of the spacer is elongated, the solubility may increase. At the same time, a deformation may be more easily generated by an external stress, and the liquid crystal molecule 310 may not fully return to an initial position in a voltage off state. In such a case, an afterimage may be significant. If the length of the spacer is short, the solubility may be reduced. At this same time, rigidity may be increased, and afterimage may be reduced. The solubility means a degree that the reactive mesogen may be dissolved in the solvent of the alignment material. In the present example embodiment, the carbon number of the alkylene group included in the spacer has the range of 2 to 5. In the present example embodiment, an afterimage level that does not significantly affect the quality of the product may be maintained and the reactive mesogen may have solubility of a degree that it may be coated along with the alignment material by being dissolved in the solvent.

According to the present example embodiment, the ring structure has a —$C_6H_4C_6H_4$- of a biphenylene structure, and the molecule structure may have a plane shape. In this structure, an attraction force may be more easily generated between the molecules such that it tends to be easily crystallized. Accordingly, the solubility may be low.

In an example embodiment, at least one hydrogen connected to the carbon ring may be substituted, for example, with F. Thus, a degree of crystallinity may be reduced by increasing a free volume. Here, the free volume may mean an empty space around a configuration particle among a volume occupied with a material.

As a substituent, for example, F, Cl, or Br may be used. Cl and Br have a larger atom size than F. Cl and Br may be more easily separated from the reactive mesogen to be easily made into an ionic material. In an embodiment, F is the substituent.

According to the present example embodiment, the reactive mesogen may be represented by Chemical Formula A or Chemical Formula B.

Chemical Formula A

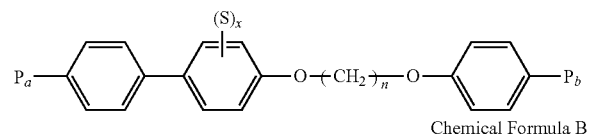

Chemical Formula B

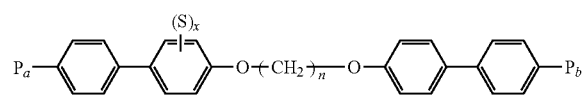

In Chemical Formula A and Chemical Formula B, Pa and Pb may independently be an acrylate group or a methacrylate group, S may be one selected from a group including F, Cl, and Br, x may be 0, 1, 2, or 3, and n may be a natural number of 2 to 5.

In the reactive mesogen represented by Chemical Formula A, two ring structures and one ring structure are connected by the spacer, while in the reactive mesogen represented by Chemical Formula B, two ring structures and two ring structures are connected by the spacer.

The reactive mesogen represented by Chemical Formula B includes four ring structures. In Chemical Formula B, x may be 1 or more and/or n may be 2 or more.

According to the present example embodiment, the reactive mesogen may include, for example, at least one among a group represented by Chemical Formula A-1 to Chemical Formula A-10. A reactive mesogen satisfying the structure of the above-described Chemical Formula A or Chemical Formula B may be included as well as those below.

Chemical Formula A-1

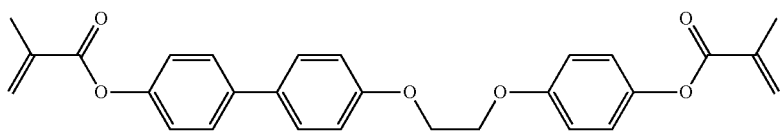

Chemical Formula A-2

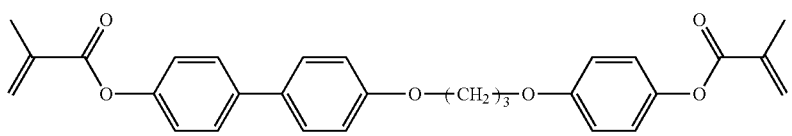

Chemical Formula A-3

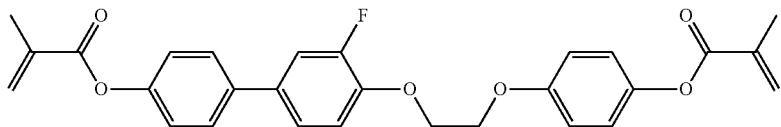

Chemical Formula A-4

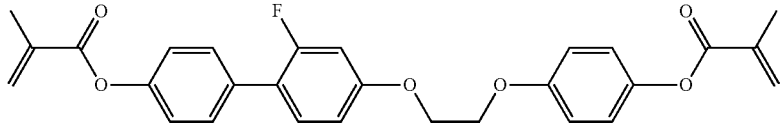

Chemical Formula A-5

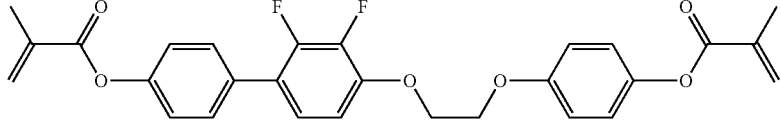

Chemical Formula A-6

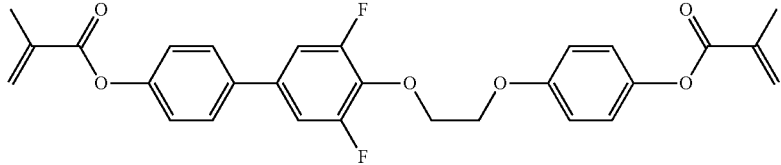

-continued

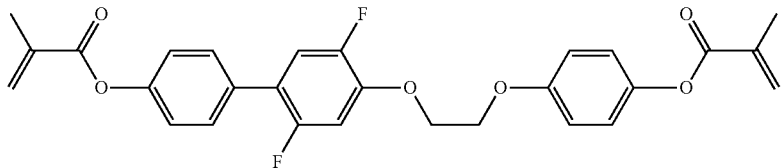

Chemical Formula A-7

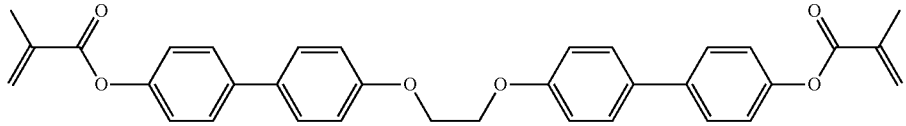

Chemical Formula A-8

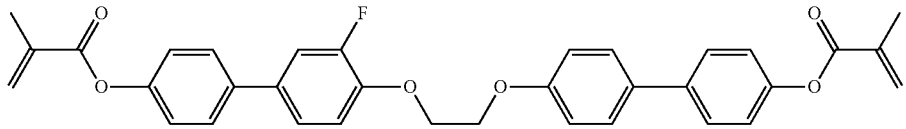

Chemical Formula A-9

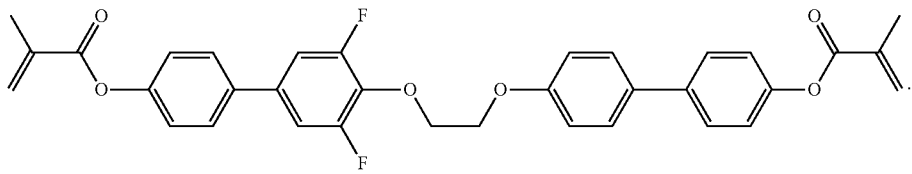

Chemical Formula A-10

Below, other constituent elements of the lower panel 100 will be described.

Again referring to FIG. 1, a plurality of gate lines are positioned on a first substrate 110. Each gate line includes a gate electrode 124 that is protruded from the gate line or a part of the gate line. A gate insulating layer 140 is positioned on the gate electrode 124, a semiconductor layer 154 is positioned on the gate insulating layer 140, and the semiconductor layer 154 overlaps the gate electrode 124.

The semiconductor layer 154 may include amorphous silicon, polycrystalline silicon, or an oxide semiconductor.

Ohmic contacts 163 and 165 may be positioned on the semiconductor layer 154. The ohmic contacts 163 and 165 may be formed of a material such as n+ hydrogenated amorphous silicon in which an n-type impurity is doped at a high concentration, or of a silicide. The ohmic contacts 163 and 165 may be omitted.

A source electrode 173 and a drain electrode 175 are positioned on the ohmic contacts 163 and 165 and the gate insulating layer 140. A plurality of data lines may be positioned on the gate insulating layer 140, and each data line may be connected to a source electrode 173.

The gate electrode 124, the source electrode 173, and the drain electrode 175 form a thin film transistor as a switching element along with the semiconductor layer 154.

A first insulating layer 180*a* is positioned on the source electrode 173 and the drain electrode 175, and the first insulating layer 180*a* may be in contact with the semiconductor layer 154 in a separate space between the source electrode 173 and the drain electrode 175. The first insulating layer 180*a* may be made of the organic insulating material or the inorganic insulating material, and may include a single layer or a multilayer.

A color filter 230 may be positioned on the first insulating layer 180*a*. The color filter 230 may display one of primary colors such as three primary colors of red, green, and blue, or the like. In an implementation, the color filter 230 may represent colors such as cyan, magenta, yellow, and a white-containing color.

A second insulating layer 180*b* may be positioned on the color filter 230, and the second insulating layer 180*b* may include the inorganic insulating material or the organic insulating material. The second insulating layer 180*b*, as an overcoat for the color filter 230, may be used to help prevent the color filter from being exposed outside and for realizing a flat surface. The second insulating layer 180*b* may be omitted.

A pixel electrode 191 is positioned on the second insulating layer 180*b*, and the pixel electrode 191 is mainly positioned in a transmission region TA. The above-described gate line, data line, thin film transistor, and the like may be positioned in a light blocking region BA where light is not transmitted. The transmission region TA as a region where the image is mainly displayed is a region where the light may be transmitted, and the light blocking region BA is not a region for displaying the image and may be a region where the light may not be mainly transmitted.

The first insulating layer 180*a* and the second insulating layer 180*b* have a contact hole 185, and the drain electrode 175 and the pixel electrode 191 are electrically connected to each other through the contact hole 185.

Referring to FIG. 2, the pixel electrode 191 includes a cross-shaped stem portion including a longitudinal stem portion 192 and a transverse stem portion 193 crossing the longitudinal stem portion 192. Also, the pixel electrode 191 is divided into a first sub-region Da, a second sub-region Db, a third sub-region Dc, and a fourth sub-region Dd by the longitudinal step portion 192 and the transverse stem portion 193, and each sub-region includes a plurality of first to fourth fine branched portions 194*a*, 194*b*, 194*c*, and 194*d*.

The first fine branched portion 194*a* extends obliquely in an upper left direction from the transverse stem portion 193 or the longitudinal stem portion 192, and the second fine branched portion 194*b* extends obliquely in an upper right direction from the transverse stem portion 193 or the vertical stem portion 192. In addition, the third fine branched portion 194*c* extends obliquely in a lower left direction from the transverse stem portion 193 or the longitudinal stem portion 192, and the fourth fine branched portion 194d extends obliquely in a lower right direction from the transverse stem portion 193 or the vertical stem portion 192.

If voltages are applied to the pixel electrode 191 shown in FIG. 1 and a common electrode 270 that will be described below, the liquid crystal molecules 310 are inclined such that a long axis thereof is aligned in a direction perpendicular to a direction of an electric field by the electric field formed to the liquid crystal layer 3. The change degree of polarization of the light that is incident to the liquid crystal layer 3 is changed according to the inclination degree of the liquid crystal molecules 310. and this change of polarization appears as a change of transmittance by the polarizer, thereby displaying images of the liquid crystal display.

A direction in which the liquid crystal molecule 310 is inclined is determined by the fine branched portions 194a, 194b, 194c, and 194d of the pixel electrode 191, and the liquid crystal molecule 310 is inclined toward a direction parallel with length directions of the fine branched portions 194a, 194b, 194c, and 194d. The one pixel electrode 191 includes four sub-regions Da, Db, Dc, and Dd in which the length directions of the fine branched portions 194a, 194b, 194c, and 194d are different from each other, and therefore directions in which the liquid crystal molecules 310 are inclined is approximately four directions. In this case, the liquid crystal layer 3 is formed with four domains in which the alignment directions of the liquid crystal molecules 310 are different. As described above, the direction in which the liquid crystal molecules are inclined varies, such that the viewing angle of the liquid crystal display may be improved.

Again referring to FIG. 1, a light blocking member 220 is positioned on the second insulating layer 180b and the pixel electrode 191. The light blocking member 220 is positioned in the light blocking region BA. The light blocking member 220 is referred to as a black matrix.

The light blocking member 220 includes a spacer 221 and a main light blocking portion 222. The main light blocking portion 222 to prevent light leakage is formed in the light blocking region BA positioned with the gate line, the data line, the thin film transistor, and the like, and the main light blocking portion 222 may have a substantially flat upper surface. The main light blocking portion 222 may overlap the contact hole 185. The main light blocking portion 222 overlapping the contact hole 185 fills the step generated in the contact hole 185, thereby flattening the surface and preventing light leakage therearound.

The spacer 221 is connected to the main light blocking portion 222. The spacer 221 may be positioned on the signal line such as the thin film transistor and/or the gate line and the data line. In FIG. 1, the spacer 221 is separated from the upper panel 200, as an example variation, the spacer 221 and the upper panel 200 may be in contact.

The spacer 221 serves to maintain a cell gap between the upper panel 200 and the lower panel 100. For example, when a distance between the upper panel 200 and the lower panel 100 becomes narrow by an external pressure against the liquid crystal display, it has a function of maintaining the cell gap between the upper panel 200 and the lower panel 100.

Here, the described content simultaneously forming the light blocking portion 222 and the spacer 221 may be varied, and as an example variation, the light blocking portion 222 and the spacer 221 may be separately formed.

The first alignment layer 11 is positioned on the pixel electrode 191. In the present example embodiment, the first alignment layer 11 includes a first polymer, the first polymer includes a first main chain and a plurality of first side chains connected to the first main chain, and at least one among a plurality of first side chains may include one among a photoreactive group and a photoreactive group derivative. Here, the photoreactive group derivative means a structure in which the photoreactive group irradiated with ultraviolet rays is chemically combined with the reactive mesogen to be modified. At least one among the plurality of first side chains may include a vertical alignment group.

The photoreactive group may use various materials that may generate a radical by absorbing the light to initiate a polymerization reaction.

According to the present example embodiment, the photoreactive group may include at least one among a group represented by Chemical Formula 1 to Chemical Formula 12.

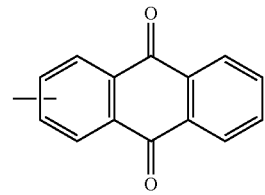

Chemical Formula 1

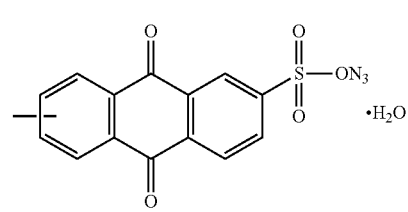

Chemical Formula 2

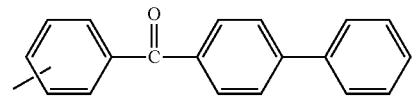

Chemical Formula 3

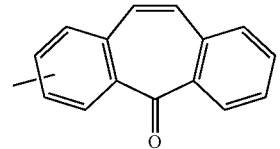

Chemical Formula 4

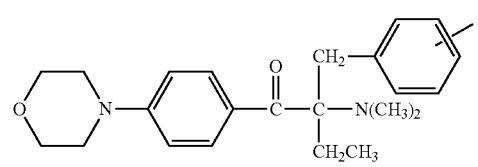

Chemical Formula 5

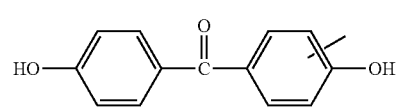

Chemical Formula 6

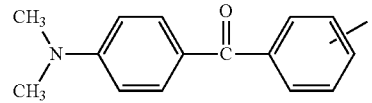

Chemical Formula 7

Chemical Formula 8

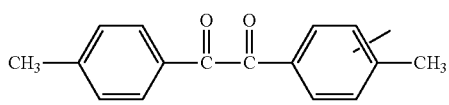

Chemical Formula 9

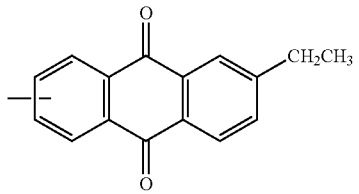

Chemical Formula 10

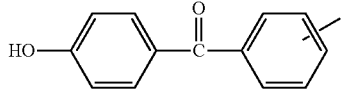

Chemical Formula 11

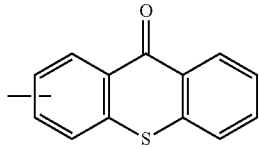

Chemical Formula 12

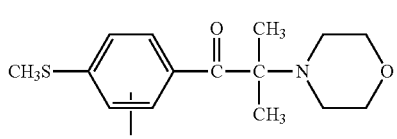

Alternatively, the first alignment layer 11 may not include the photoreactive group or the photoreactive group derivative, and in this case, the plurality of protrusions 15 may also be formed in the surface of the first alignment layer 11 by the polymerization reaction of the reactive mesogen by ultraviolet rays.

Referring to the upper panel 200, the common electrode 270 may be positioned between a second substrate 210 and the liquid crystal layer 3. The common electrode 270 may be formed as a whole plate on the entire surface of the second substrate 210 facing the liquid crystal layer 3. The second alignment layer 21 is positioned between the common electrode 270 and the liquid crystal layer 3, and the second alignment layer 21 may be an alignment layer made of the same components as the above-described first alignment layer 11.

The liquid crystal layer 3 includes the liquid crystal molecules 310. The liquid crystal molecule 310 may have negative dielectric anisotropy such that the liquid crystal molecules 310 may be aligned in the direction substantially perpendicular to the first and second substrates 110 and 210 in the absence of the electric field to the liquid crystal layer 3. The liquid crystal molecules 310 may have the pre-tilt in the predetermined direction by the plurality of above-described protrusions 15 and 25 in the absence of the electric field to the liquid crystal layer 3.

In the present example embodiment, the liquid crystal layer may not include a photoinitiator. A photoinitiator included in the liquid crystal layer may remain after irradiation of the ultraviolet rays and may function as an impurity, which may cause a surface afterimage.

Figure 3:
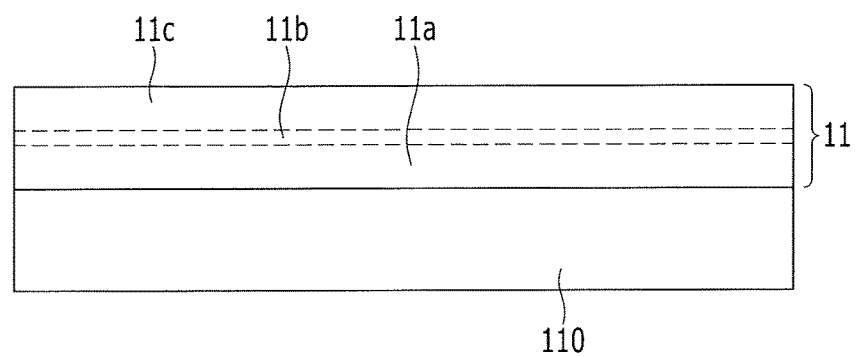
FIG. 3 illustrates a schematic cross-sectional view showing an alignment layer structure of FIG. 1.

FIG. 3 is a schematic cross-sectional view showing an alignment layer structure of FIG. 1. In FIG. 3, for convenience of the description, other constituent elements are omitted, and only the first alignment layer 11 positioned on the first substrate 110 shown in FIG. 1 is schematically shown.

Referring to FIG. 3, the first alignment layer 11 includes a lower alignment layer 11a, an upper alignment layer 11c, and a buffer region 11b positioned between the lower alignment layer 11a and the upper alignment layer 11c. The lower alignment layer 11a mainly includes the vertical alignment group of which the side chain is connected to the main chain and a component to improve a voltage holding rate, and the upper alignment layer 11c mainly includes the side chain including at least one of the photoreactive group and the photoreactive group derivative.

A bake process may be performed in the process of forming the alignment layer, and in this case, the alignment lower may be phase-divided into the alignment layer 11a and the upper alignment layer 11c by a surface energy difference. Buffer region 11b may be formed between phases. The buffer region 11b is a part where the component of the lower alignment layer 11a and the component of the upper alignment layer 11c are mixed, and the buffer region 11b may include a smaller amount of the photoreactive group than the content of at least one of the photoreactive group and the photoreactive group derivative included in the upper alignment layer 11c. To improve the afterimage, the component of the upper alignment layer 11c may be about 30 wt % or more of the entire component of the first alignment layer 11.

Figure 4:
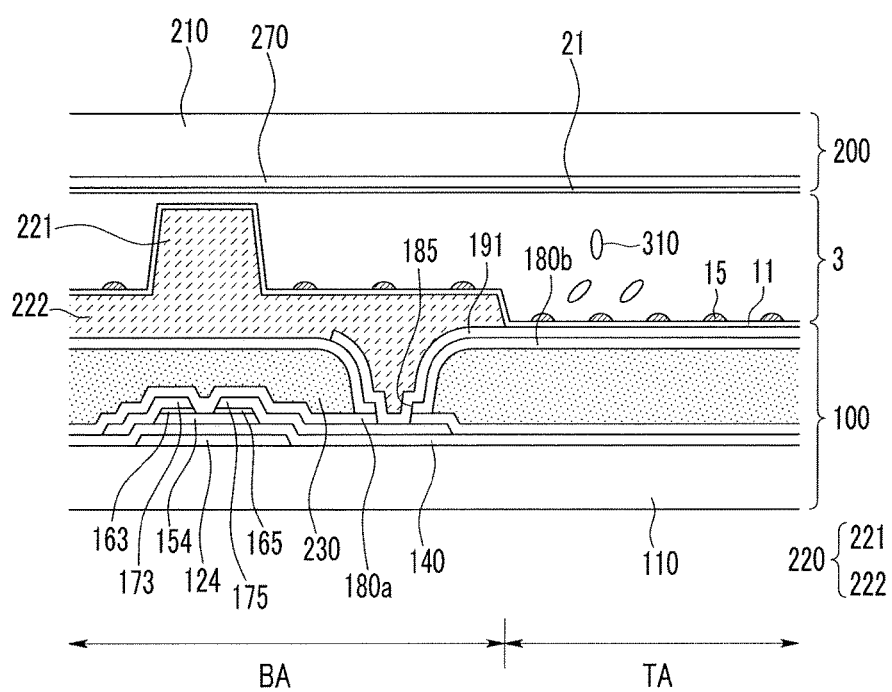
FIG. 4 illustrates a cross-sectional view of a liquid crystal display according to a variation example embodiment of FIG. 1.

FIG. 4 is a cross-sectional view of a liquid crystal display according to a variation example embodiment of FIG. 1.

FIG. 4 is the cross-sectional view of the liquid crystal display according to an example embodiment, and it is the description related to the example embodiment that reduces the texture of the curved liquid crystal display.

Referring to FIG. 4, most constituent elements are the same as those described in FIG. 1, and differences will be described.

Referring to FIG. 4, the first alignment layer 11 is positioned between the pixel electrode 191 and the liquid crystal layer 3, and the second alignment layer 21 is positioned between the common electrode 270 and the liquid crystal layer 3.

The first and second alignment layers 11 and 21 may be vertical alignment layers. The first alignment layer 11 includes the first polymer, the first polymer includes the first main chain and the plurality of first side chains connected to the first main chain, and at least one among the plurality of first side chains may include at least one of the photoreactive group and the photoreactive group derivative.

The second alignment layer 21 includes the second polymer, the second polymer includes the second main chain and the plurality of second side chains connected to the second main chain, and the plurality of second side chains may not include the photoreactive group and the photoreactive group derivative.

The photoreactive group included in the side chain may help increase the reaction speed during the polymerization of the reactive mesogen by the irradiation of ultraviolet rays. Accordingly, the plurality of protrusions 15 may be mainly formed in the surface of the first alignment layer 11.

The reactive mesogen mixed in the alignment material forming the first and second alignment layers 11 and 21 may be eluted into the liquid crystal layer 3 in the heat treatment process, and may be photoirradiated such that the polymer included in the protrusion 15 may be formed.

The plurality of protrusions 15 may help control the pre-tilt as the initial alignment direction of the liquid crystal molecules 310. The photoreactive group included in the side chain of the polymer of the first alignment layer 11 may help improve the polarization reaction speed of the reactive mesogen. Accordingly, the pre-tilt angles of the liquid crystal molecules 310 adjacent to the second alignment layer 21 and the liquid crystal molecules 310 adjacent to the first alignment layer 11 may be different.

Herein, 'pre-tilt' means that the liquid crystal molecule 310 is inclined with reference to the direction perpendicular to the surface of the first alignment layer 11 or the second alignment layer 21, and 'pre-tilt angle' means the inclined degree, that is, the inclined angle with reference to an axis perpendicular to the first alignment layer 11 or the second alignment layer 21.

As shown in FIG. 4, the plurality of protrusions 15 may only be between the first alignment layer 11 and the liquid crystal layer 3, or as an example variation, the plurality of protrusions may be formed between the second alignment layer 21 and the liquid crystal layer 3, and in this case, the number of the plurality of protrusions formed between the second alignment layer 21 and the liquid crystal layer 3 may be significantly smaller than the number of the plurality of protrusions 15 formed between the first alignment layer 11 and the liquid crystal layer 3. For example, comparing a protrusion density (corresponding to the number of protrusions in a unit area), the density of the plurality of protrusions positioned between the first alignment layer 11 and the liquid crystal layer 3 is larger than the density of the plurality of protrusions positioned between the second alignment layer 21 and the liquid crystal layer 3. In this case, the size of the protrusions positioned between the first alignment layer 11 and the liquid crystal layer 3 is smaller than the size of the protrusions positioned between the second alignment layer 21 and the liquid crystal layer 3.

By differentiating the protrusion density of the lower panel 100 and the upper panel 200, the pre-tilt angle of the liquid crystal molecules 310 adjacent to the first alignment layer 11 and the pre-tilt angle of the liquid crystal molecules 310 adjacent to the second alignment layer 21 may be differentiated. As the density of the protrusions 15 positioned on the first alignment layer 11 increases, the pre-tilt angle of the liquid crystal molecules 310 adjacent to the first alignment layer 11 may be larger than the pre-tilt angle of the liquid crystal molecules 310 adjacent to the second alignment layer 21.

For example, the liquid crystal molecules 310 adjacent to the first alignment layer 11 may have an angle of more than 80 degrees to less than 89 degrees with respect to the surface of the first alignment layer 11. The liquid crystal molecules 310 adjacent to the second alignment layer 21 may be arranged at an angle of more than 89 degrees to 90 degrees or less, to be close to substantially perpendicular to the surface of the second alignment layer 21.

Figure 5:
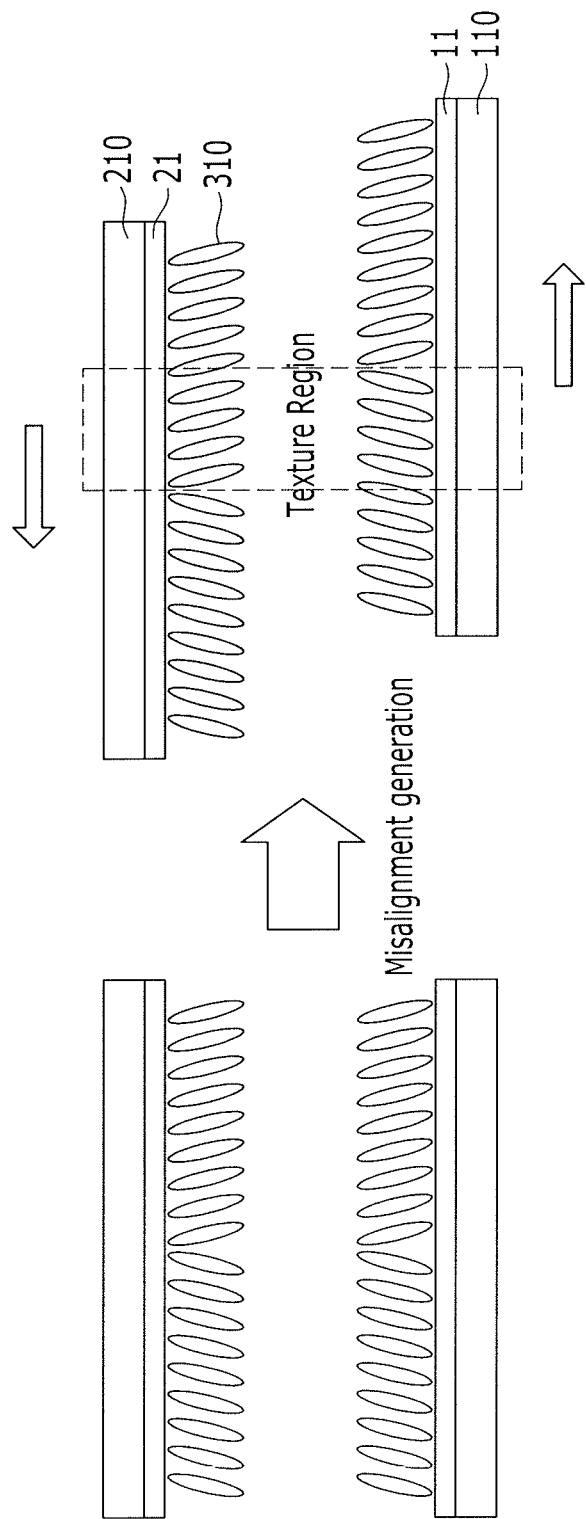
FIG. 5 illustrates a view explaining a texture defect by a misalignment when pre-tilt angles of liquid crystal molecules adjacent to upper and lower alignment layers are the same.

FIG. 5 is a view explaining a texture defect by a misalignment when pre-tilt angles of liquid crystal molecules adjacent to upper and lower alignment layers are the same.

FIG. 5, for convenience of explanation, schematically shows the first and second substrates 110 and 210 facing each other, the first and second alignment layers 11 and 21, and the liquid crystal molecules 310. Also, FIG. 5 shows the part corresponding to the transmission region TA in the region shown in FIG. 4 and the cross-section taken along the horizontal direction of the display panel. The horizontal direction corresponds to a right/left direction when viewers view the liquid crystal display.

Between the first alignment layer 11 and the second alignment layer 21, in the region where the first alignment layer 11 and the second alignment layer 21 overlap each other, when the liquid crystal molecules 310 form the pre-tilt in the same direction, if the display panel is misaligned, the region where the direction of the pre-tilt of the liquid crystal molecules 310 adjacent to the first alignment layer 11 and the direction of the pre-tilt of the liquid crystal molecules 310 adjacent to the second alignment layer 21 are misaligned may be generated. This region may be generated in the boundary portion of the adjacent domains, and the direction that the liquid crystal molecules 310 are inclined may be such that a texture defect is generated in the screen. The misalignment of the display panel may be generated when bending the display panel. The texture corresponds to a dark part that appears darker than the surroundings and may be recognized as a stain.

Figure 6:
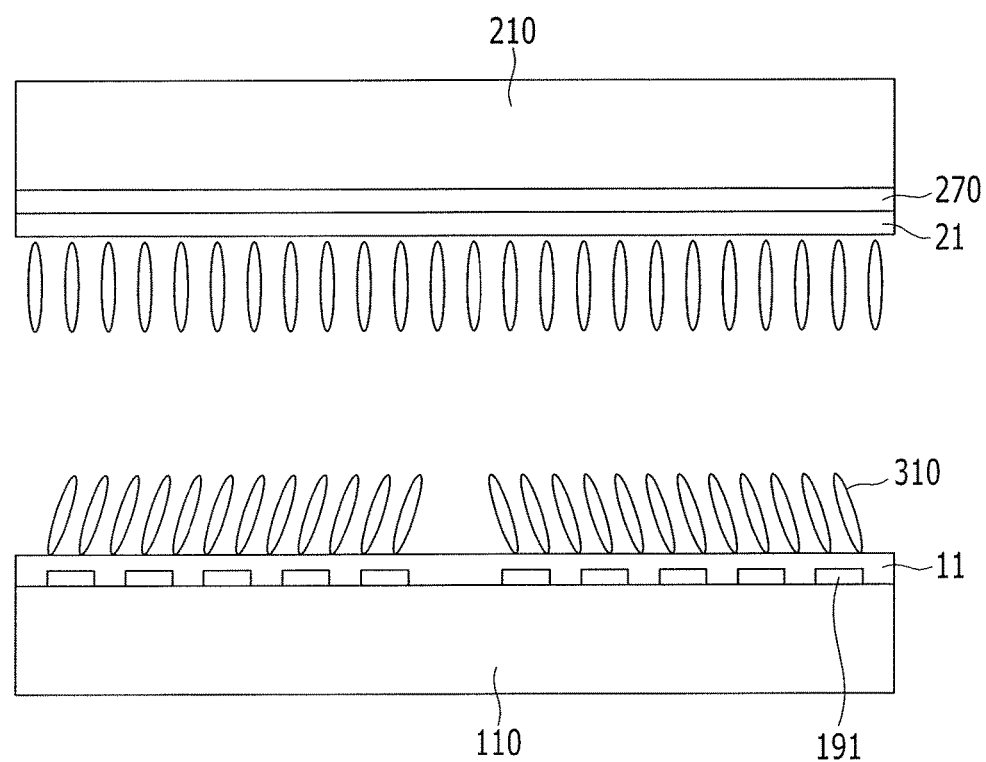
FIG. 6 illustrates a view schematically showing an arrangement of liquid crystal molecules adjacent to upper and lower alignment layers in a liquid crystal display according to an example embodiment described in FIG. 4.

FIG. 6 is a view schematically showing an arrangement of liquid crystal molecules adjacent to upper and lower alignment layers in a liquid crystal display according to an example embodiment described in FIG. 4.

For convenience of description, FIG. 6 schematically shows the first and second substrates 110 and 210 facing each other in the transmission region TA of FIG. 4, the pixel electrode 191, the common electrode 270, the first and second alignment layers 11 and 21, and the liquid crystal molecules. Also, among the region shown in FIG. 4, FIG. 6 shows the portion corresponding to the transmission region TA and is taken along the horizontal direction of the display panel. The horizontal direction corresponds to a right/left direction when viewers view the liquid crystal display.

Figure 12:
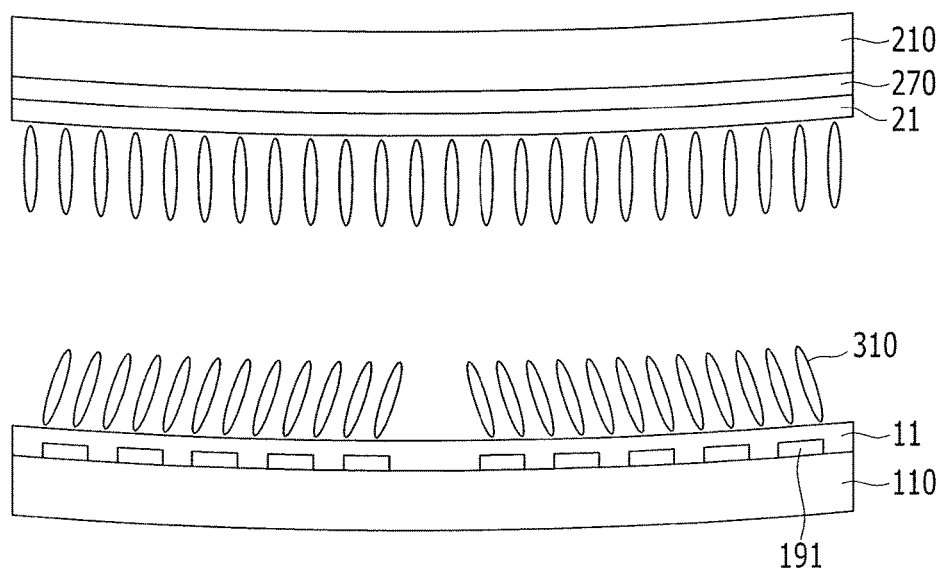
FIG. 12 illustrates a view showing a display panel that is bent to form a curved liquid crystal display in a liquid crystal display according to an example embodiment of FIG. 6.

Referring to FIG. 6, the liquid crystal display according to an example embodiment may differentiate the pre-tilt angle of the liquid crystal molecules 310 adjacent to the first alignment layer 11 and the pre-tilt angle of the liquid crystal molecules 310 adjacent to the second alignment layer 21. Accordingly, as shown in FIG. 12, although the display panel is bent to form the curved liquid crystal display, the texture region may not be generated in the boundary of the adjacent domain regions.

FIG. 7 to FIG. 11 are views showing a manufacturing method of a liquid crystal display according to an example embodiment.

Firstly, the configurations included in the lower panel 100 and the upper panel 200 shown in FIG. 4 may be respectively manufactured in the first substrate 110 and the second substrate 210.

For example, in FIG. 4, the gate electrode 124, the source electrode 173, the drain electrode 175. and the pixel electrode 191 are formed on the first substrate 110, and the common electrode 270 is formed on the second substrate 210.

Figure 7:
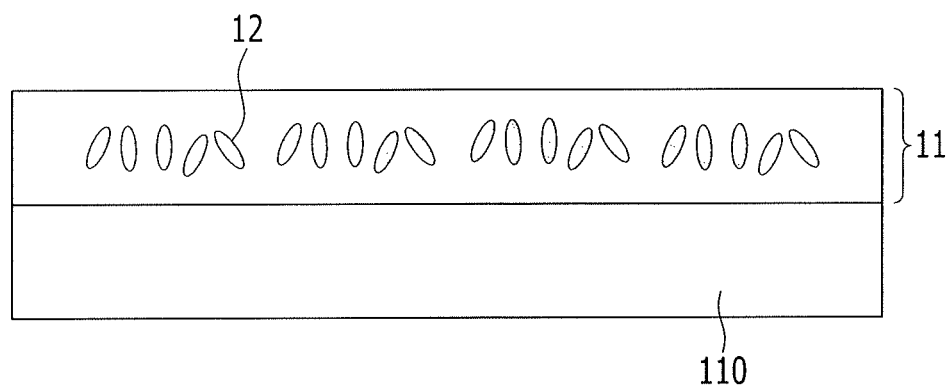
FIG. 7 to FIG. 11 illustrate views showing a manufacturing method of a liquid crystal display according to an example embodiment.

Referring to FIG. 7, the first alignment layer 11 may be formed to cover the pixel electrode positioned on the first substrate 110, and although not shown in FIG. 7, the second alignment layer may be formed to cover the common electrode on the second substrate like the first alignment layer 11.

In detail, a mixture of the alignment material including the first polymer (which may be, for example, a polyimide) and the reactive mesogen 12 is coated on the first substrate 110, and a bake process is performed to form the first alignment layer 11. According to the present example embodiment, the first polymer included in the alignment material includes the first main chain and the plurality of first side chains connected to the first main chain, and at least one among the plurality of first side chains includes the photoreactive group. The photoreactive group and the reactive mesogen 12 may use the above-described material. The reactive mesogen 12 may be added in the range of, for example, 7 wt % to 25 wt % for a solid of the alignment material. For example, the content of about 15 wt % may be added.

A mixture of the alignment material including the second polymer (which may be, for example, a polyimide) and the reactive mesogen is coated on the second substrate 210 and the bake process is performed to form the second alignment layer.

Phase separation may be generated during the above-described bake process, and as described FIG. 3, the upper and lower alignment layers and the buffer region positioned therebetween may be formed.

The polymerization of the reactive mesogen 12 may be initialized by the heat generated in the bake process, however, when using the above-described reactive mesogen 12 according to an example embodiment, the reactive mesogen 12 has heat resistance such that the reactive mesogen 12 may be prevented from being previously polymerized in the bake process. Accordingly, the reactivity of the reactive mesogen 12 by the ultraviolet rays irradiation may be maintained.

It is described that the reactive mesogen 12 is mixed in both the first alignment layer 11 and the second alignment layer; however, the reactive mesogen 12 may only be mixed in one of the first alignment layer 11 and the second alignment layer.

Figure 8:
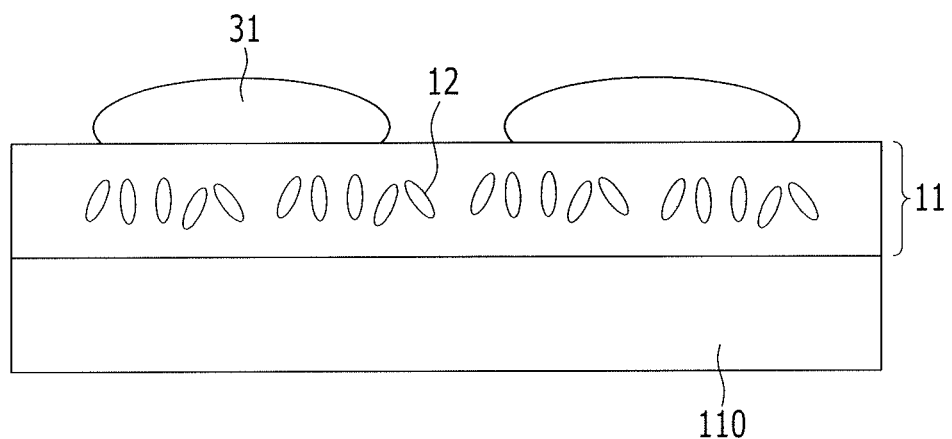
Figure 9:
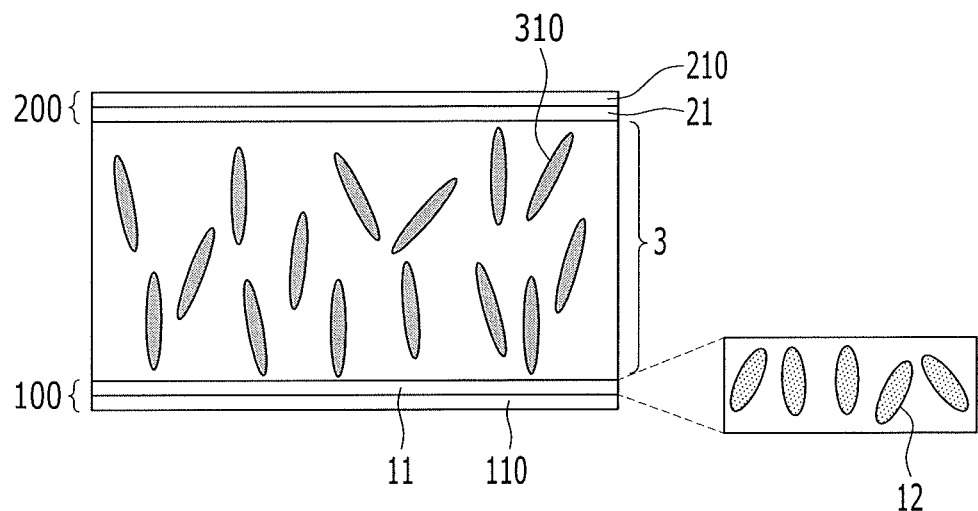

Referring to FIG. 8, the liquid crystal material 31 including the liquid crystal molecules is dripped on the first alignment layer 11, and referring to FIG. 9, the lower panel 100 and the upper panel 200 manufactured as above-described are assembled.

Figure 10:
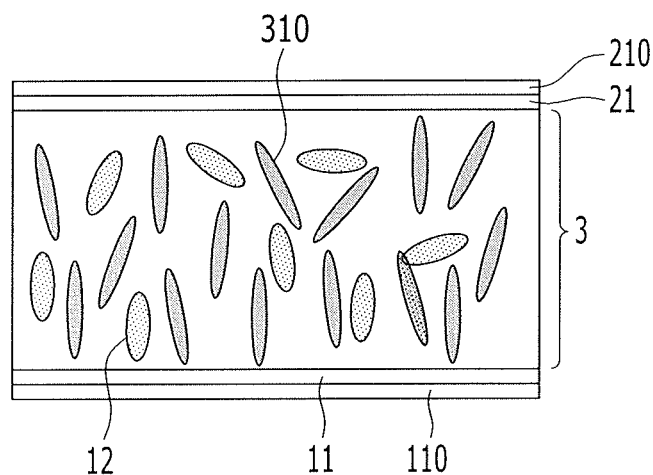

Referring to FIG. 10, the heat treatment may be performed to uniformly spread the liquid crystal material 31 dripped in FIG. 8, and in this case, the reactive mesogen 12 included in the alignment layers 11 and 21 is adsorbed into the liquid crystal layer 3.

Next, in a state that the electric field is applied to the liquid crystal layer 3, the light is irradiated. Here, the light may be ultraviolet light having a wavelength that is appropriate for polymerizing the reactive mesogen 12.

Figure 11:
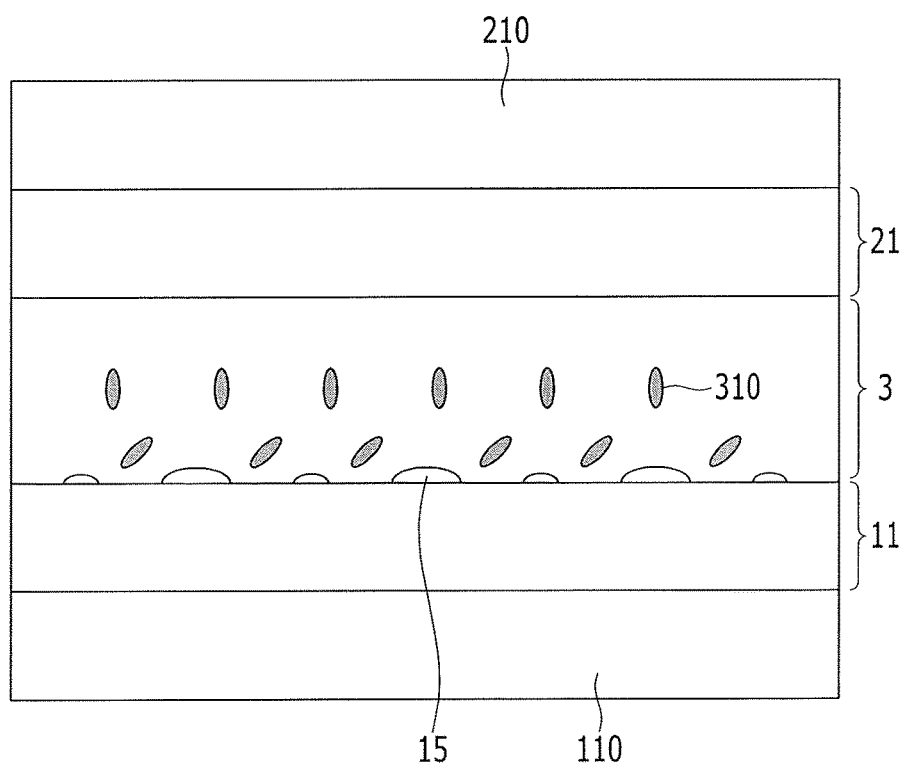

Referring to FIG. 11, as the surface energy is increased while the reactive mesogen 12 included in the liquid crystal layer 3 is polymerized, the reactive mesogen 12 moves into the surface of the alignment layers 11 and 21 such that the plurality of protrusions 15 are formed. In the present example embodiment, the only first alignment layer 11 includes the photoreactive group such that the polymerization reaction speed causes the difference in the portions adjacent to the first alignment layer 11 and the second alignment layer 21. That is, the reactive mesogen 12 polymerized by the photoreactive group of the first alignment layer 11 mainly forms the plurality of protrusions 15 in the surface of the first alignment layer 11. In this case, the photoreactive group is also chemically combined with the reactive mesogen, thereby forming the polymer forming the plurality of protrusions 15.

FIG. 12 is a view showing a display panel that is bent to form a curved liquid crystal display in a liquid crystal display according to an example embodiment of FIG. 6.

For convenience of explanation, FIG. 12 only schematically shows the first and second substrates 110 and 210 facing each other, the pixel electrode 191, the common electrode 270, the first and second alignment layers 11 and 21, and the liquid crystal molecules 310.

Referring to FIG. 12, the first substrate 110 and the second substrate 210 may be bent to have the curved surface.

Generally, between the first alignment layer and the second alignment layer facing each other, in the region where the first alignment layer and the second alignment layer are overlapped with each other, when the liquid crystal molecules form the pre-tilt of the same direction, if the display panel is bent, as shown in FIG. 5, the region where the pre-tilt direction of the liquid crystal molecules adjacent to the first alignment layer and the pre-tilt direction of the liquid crystal molecules adjacent to the second alignment layer are different may be generated. This region may be generated in the boundary portion of the adjacent domains. In this region, the direction that the liquid crystal molecules are inclined may be such that the texture defect is undesirably generated in the screen.

However, to form the curved liquid crystal display, although the liquid crystal display according to an example embodiment described in FIG. 4 is bent as shown in FIG. 12, the texture region is not generated on the boundary of the adjacent domain regions.

By way of summation and review, a vertical alignment mode liquid crystal display, which arranges major axes of liquid crystal molecules so as to be perpendicular to the display panel when an electric field is not applied, has been widely used due to its high contrast ratio and wide reference viewing angle. After manufacturing a flat liquid crystal display, a curved liquid crystal display may be realized by bending a flat liquid crystal display through a bending process. However, if a misalignment is generated between the upper and lower display panels overlapping each other, the transmittance may be lowered.

As described above, adding a reactive mesogen to the alignment layer or the liquid crystal layer in order to create a pre-tilt may provide quick response speed while realizing a wide viewing angle. Example embodiments may provide a liquid crystal display and a manufacturing method thereof for preventing an afterimage and a stain from being generated. According to an example embodiment, a reactive mesogen having strong heat resistance and excellent reactivity may be used, and an afterimage and a stain may be prevented from being generated in the liquid crystal display.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

<Description of symbols>

| 11: first alignment layer | 12: reactive mesogen |
|---|---|
| 15, 25: protrusion | 21: second alignment layer |
| 100: lower panel | 200: upper panel |

What is claimed is:

1. A liquid crystal display, comprising:
a first substrate;
a second substrate overlapping the first substrate;
a liquid crystal layer positioned between the first substrate and the second substrate and including a plurality of liquid crystal molecules;

a first alignment layer positioned between the first substrate and the liquid crystal layer;

a second alignment layer positioned between the second substrate and the liquid crystal layer; and a plurality of protrusions positioned at at least one of the positions of between the first alignment layer and the liquid crystal layer, and between the second alignment layer and the liquid crystal layer, wherein the first alignment layer includes a first polymer, the first polymer includes a first main chain and a plurality of first side chains connected to the first main chain, and at least one among the plurality of first side chains includes at least one of a photoreactive group and a photoreactive group derivative, wherein at least one among the plurality of protrusions includes a polymer of a reactive mesogen, wherein the photoreactive group or photoreactive group derivative is chemically combined with the polymer of the reactive mesogen included in the plurality of protrusions, and the reactive mesogen is represented by Chemical Formula 1:

$$P_a—A_1—O(-CH_2-)_n O—A_2—P_b \quad \text{Chemical Formula 1}$$

wherein, in Chemical Formula 1,

Pa and Pb are independently an acrylate group or a methacrylate group, $A_1$ includes

in which at least one hydrogen connected to a carbon ring is unsubstituted or substituted with one selected from a group including F, Cl, and Br, $A_2$ includes any one of

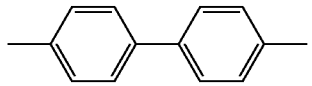
and
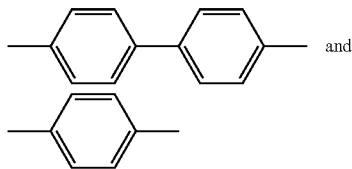

in which at least one hydrogen connected to the carbon ring is unsubstituted or substituted with one selected from the group including F, Cl, and Br, and n is a natural number of 2 to 5.

2. The liquid crystal display as claimed in claim 1, wherein the second alignment layer includes a second polymer, the second polymer includes a second main chain and a plurality of second side chains connected to the second main chain, and the plurality of second side chains do not include the photoreactive group and the photoreactive group derivative.

3. The liquid crystal display as claimed in claim 1, wherein the reactive mesogen is represented by Chemical Formula A or Chemical Formula B:

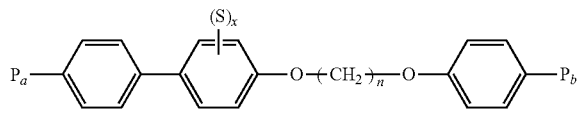

Chemical Formula A

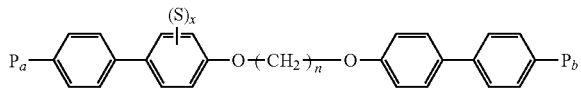

Chemical Formula B wherein, in Chemical Formula A and Chemical Formula B, Pa and Pb are independently the acrylate group or the methacrylate group, S is one selected from a group including F, Cl, and Br, x is 0, 1, 2, or 3, and n is the natural number of 2 to 5.

4. The liquid crystal display as claimed in claim 1, wherein the reactive mesogen has heat resistance of about 250 degrees Celsius or more.

5. The liquid crystal display as claimed in claim 4, wherein the density of the protrusions positioned between the first alignment layer and the liquid crystal layer is higher than the density of the protrusions positioned between the second alignment layer and the liquid crystal layer among the plurality of protrusions.

6. The liquid crystal display as claimed in claim 1, wherein the pre-tilt angle of the liquid crystal molecules adjacent to the first alignment layer among the plurality of liquid crystal molecules is larger than the pre-tilt angle of the liquid crystal molecules adjacent to the second alignment layer among the plurality of liquid crystal molecules.

7. The liquid crystal display as claimed in claim 1, wherein the first substrate and the second substrate have a curved surface.

8. The liquid crystal display as claimed in claim 1, further comprising:
a thin film transistor positioned between the first substrate and the first alignment layer;
a pixel electrode connected to the thin film transistor; and
a common electrode forming an electric field with the pixel electrode.

9. The liquid crystal display as claimed in claim 1, wherein
the first alignment layer includes a lower alignment layer, an upper alignment layer, and a buffer region positioned between the lower alignment layer and the upper alignment layer,
the upper alignment layer includes at least one of the photoreactive group and the photoreactive group derivative, the lower alignment layer does not include the photoreactive group and the photoreactive group derivative, and the buffer region includes less of the photoreactive group than the content of at least one of the photoreactive group and the photoreactive group derivative of the upper alignment layer.

10. A method for manufacturing a liquid crystal display, comprising:
preparing a lower panel including a first alignment layer positioned on a first substrate;
preparing an upper panel including a second alignment layer positioned on a second substrate;
forming a liquid crystal layer positioned between the lower panel and the upper panel and including a plurality of liquid crystal molecules;

heat-treating the upper panel and the lower panel; and
irradiating light to the lower panel, the upper panel, and the liquid crystal layer in a state in which an electric field is applied to the liquid crystal layer, and
in the step of the heat treatment, the reactive mesogen included in at least one of the first alignment layer and the second alignment layer is adsorbed into the liquid crystal layer,
in the light irradiation step, the reactive mesogen is polymerized to form a plurality of protrusions positioned at at least one of the positions of between the first alignment layer and the liquid crystal layer, and between the second alignment layer and the liquid crystal layer, wherein the first alignment layer includes a first polymer, the first polymer includes a first main chain and a plurality of first side chains connected to the first main chain, and at least one among the plurality of first side chains includes at least one of a photoreactive group and a photoreactive group derivative,
wherein the photoreactive group or photoreactive group derivative is chemically combined with the polymer of the reactive mesogen forming the plurality of protrusions, and
the reactive mesogen is represented by Chemical Formula 1:

$$P_a—A_1—O\text{-}(CH_2)_n\text{-}O—A_2—P_b \qquad \text{Chemical Formula 1}$$

wherein, in Chemical Formula 1, Pa and Pb are independently an acrylate group or a methacrylate group,
$A_1$ includes

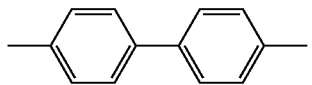

in which at least one hydrogen connected to a carbon ring is unsubstituted or substituted with one selected from a group including F, Cl, and Br,
$A_2$ includes any one of

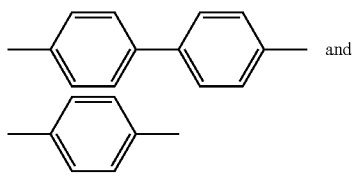

and in which at least one hydrogen connected to the carbon ring is unsubstituted or substituted with one selected from the group including F, Cl, and Br, and n is a natural number of 2 to 5.

11. The method as claimed in claim 10, wherein the second alignment layer includes a second polymer, the second polymer includes a second main chain and a plurality of second side chains connected to the second main chain, and the plurality of second side chains do not include the photoreactive group.

12. The method as claimed in claim 10, wherein the reactive mesogen is represented by Chemical Formula A or Chemical Formula B:

Chemical Formula A

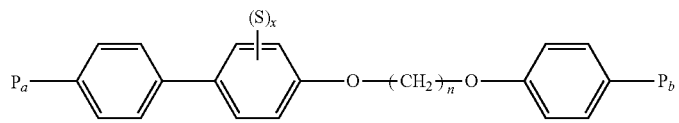

Chemical Formula B

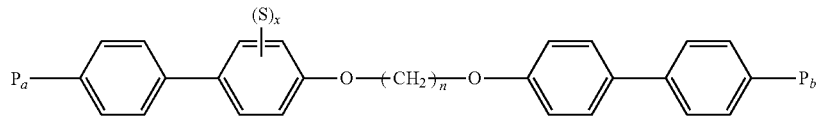

wherein, in Chemical Formula A and Chemical Formula B, Pa and Pb are independently the acrylate group or the methacrylate group, S is one selected from a group including F, Cl, and Br, x is 0, 1, 2, or 3, and n is the natural number of 2 to 5.

13. The method as claimed in claim 10, wherein
among the plurality of protrusions, the density of the protrusions positioned between the first alignment layer and the liquid crystal layer is higher than the density of the protrusions positioned between the second alignment layer and the liquid crystal layer.

14. The method as claimed in claim 13, wherein
the size of the protrusions positioned between the first alignment layer and the liquid crystal layer is smaller than the size of the protrusions positioned between the second alignment layer and the liquid crystal layer.

15. The method as claimed in claim 10, wherein
after the step of light irradiation, the pre-tilt angle of the liquid crystal molecules adjacent to the first alignment layer among the plurality of liquid crystal molecules is larger than the pre-tilt angle of the liquid crystal molecules adjacent to the second alignment layer among the plurality of liquid crystal molecules.

16. The method as claimed in claim 10, further comprising providing a curved surface to the first substrate and the second substrate.

17. The method as claimed in claim 10, wherein
the first alignment layer is divided into a lower alignment layer and an upper alignment layer, a buffer region is formed between the lower alignment layer and the upper alignment layer,
the upper alignment layer includes the photoreactive group, the lower alignment layer does not include the photoreactive group, and the buffer region includes less of the photoreactive group than the content of the photoreactive group distributed in the upper alignment layer.

18. A liquid crystal display, comprising:
a first substrate;
a second substrate facing the first substrate;
a liquid crystal layer between the first substrate and the second substrate; and
an alignment layer between the first substrate and the second substrate and adjacent to the liquid crystal layer, the alignment layer having protruding polymeric structures positioned between the alignment layer and the liquid crystal layer, the polymeric structures being chemically coupled to the material of the alignment layer via a (meth)acrylate moiety, the polymeric structures being polymers of reactive mesogens comprising (meth)acrylate terminal moieties, different from the material of the alignment layer, and including a polymer unit having a first moiety that is a divalent biphenyl moiety, a diether linkage in which two oxygens are joined by a carbon chain of 2 to 5 carbons, and a second moiety that is a divalent phenyl or biphenyl moiety, wherein the first and second moieties are directly connected by the diether linkage.

19. The liquid crystal display as claimed in claim 18, wherein the polymer unit is represented by Chemical Formula 2:

  Chemical Formula 2 wherein, in Chemical Formula 2, A1 is the first moiety, A2 is the second moiety, and n is a natural number of 2 to 5.

20. The liquid crystal display as claimed in claim 19, wherein $A_1$ includes

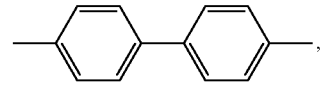

and $A_2$ includes

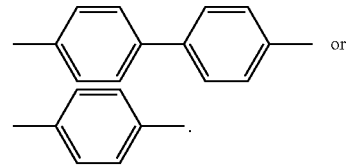

21. The liquid crystal display as claimed in claim 20, wherein, in $A_1$, at least one hydrogen connected to a carbon ring is substituted with F, Cl, or Br.

22. The liquid crystal display as claimed in claim 20, wherein, in $A_2$, at least one hydrogen connected to a carbon ring is substituted with F, Cl, or Br.

* * * * *